UNITED STATES PATENT OFFICE.

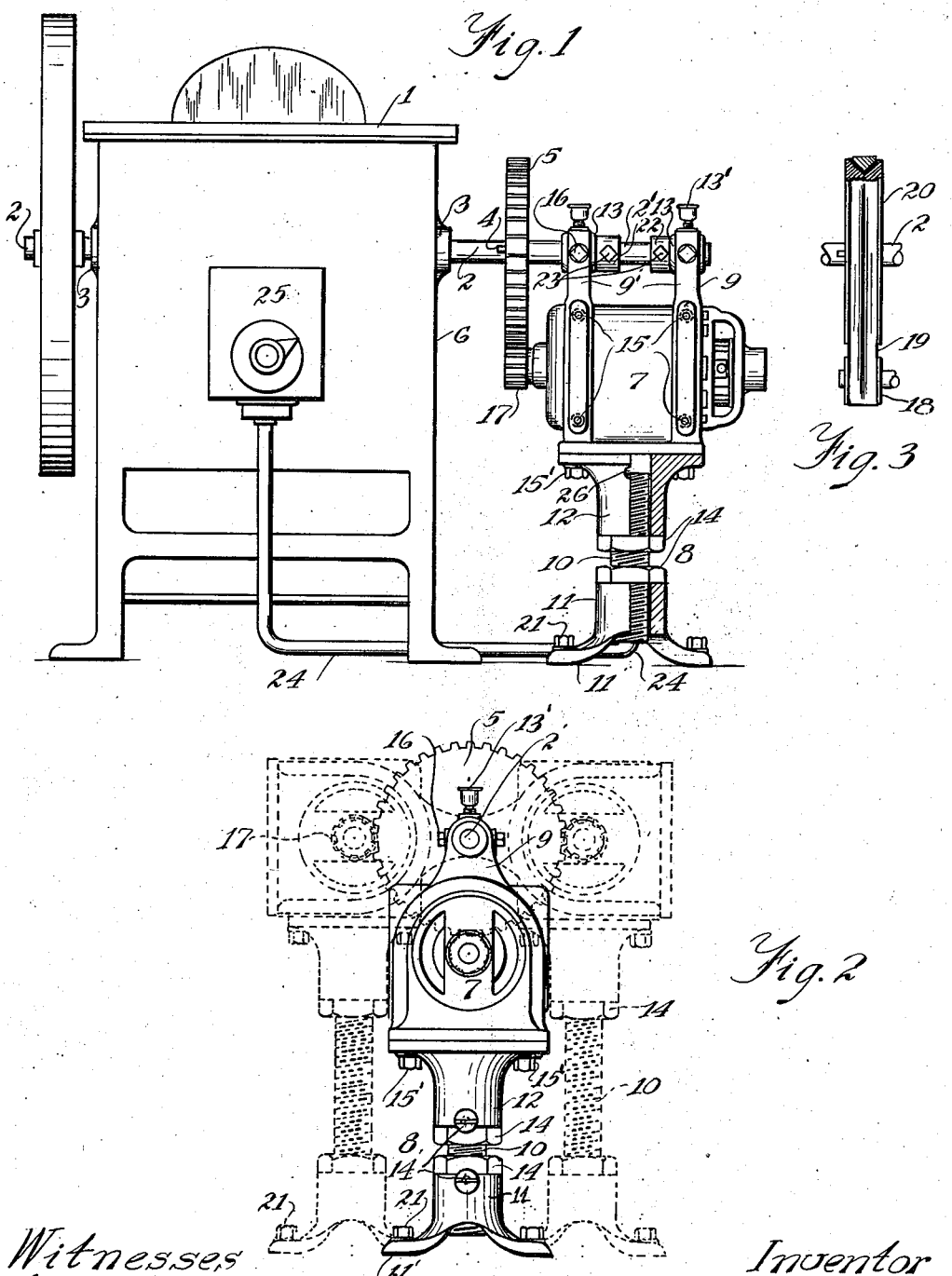

AUSTIN KIMBLE, OF GLENELLYN, ILLINOIS.

MOTOR ATTACHMENT FOR POWER-DRIVEN MACHINES.

1,242,204.  Specification of Letters Patent.  Patented Oct. 9, 1917.

Application filed November 17, 1916. Serial No. 131,980.

*To all whom it may concern:*

Be it known that I, AUSTIN KIMBLE, a citizen of the United States of America, and a resident of Glenellyn, county of Dupage, and State of Illinois, have invented certain new and useful Improvements in Motor Attachments for Power-Driven Machines, of which the following is a specification.

This invention relates to motor attachments for power driven machines, and more particularly is adapted for use in connection with printing presses of a type now in common use, and having a shaft extension through which power is supplied to the press. Heretofore it has been customary to furnish power to printing presses and various other power driven machines either by shafting and belt connected pulleys, or by means of an electric motor mounted either on the machine itself or on an adjacent part of the building, usually on the wall or floor, the motor being belt connected to a suitable driving pulley mounted on a shaft projecting from the machine. In order to mount the motor on the frame of the machine, it has usually been necessary to provide a mounting bracket attached to the frame, thus necessitating special castings and tools, and a considerable degree of mechanical skill for drilling and tapping, and for fitting the brackets in place and connecting the motor.

The main objects of this invention are to provide means of improved form for connecting a motor to the apparatus or machine to be driven; to provide an improved form of motor-mounting means of adjustable character adapted for ready attachment to the shaft of the machine to be driven, and adapted for holding the motor either beneath or at one side of the shaft; to provide an improved form of adjustable motor attachment adapted to facilitate gearing the motor directly to the machine to be driven; and to provide adjustable means for attaching a motor to a machine independently of the frame of the machine.

An illustrative embodiment of this invention is shown in the accompanying drawings, in which:

Figure 1 is a front elevation of the motor attachment as applied to a power driven machine.

Fig. 2 is an end elevation of the motor attachment as viewed from the right of Fig. 1, the normal or upright position of the motor being indicated by full lines and two alternative positions for lateral mounting of the motor being shown in dotted outlines.

Fig. 3 shows a form of belt connection for the motor which may be used in place of the gearing shown in Fig. 1.

In the construction shown in the drawings, the machine 1 to be driven has a drive shaft 2 journaled thereon at 3—3. Said shaft includes an end part 2' projecting at one side of the machine, to receive power. Said projecting part is slotted to accommodate a key 4 whereby a power transmission member, as a driving pulley or gear wheel 5, may be attached adjacent to the frame 6 of the machine. The outer part of the shaft projection is smooth; and heretofore, in certain machines, has been used for carrying a loose pulley disposed beside the drive pulley, as usual in the art.

By this invention the loose pulley and coacting belt and belt shifter are done away with, and a motor attachment is mounted on the shaft end 2', as shown in Fig. 1, and gearing preferably is substituted for the pulley and belt. The said motor attachment comprises a motor proper 7, means 8 bearing on the floor for supporting same, and means 9 extending from the motor to the shaft 2 for securing and steadying said attachment and adapted to hold the motor shaft in definite spaced relation to the machine shaft 2, one of said means, preferably the lower or floor bearing part 8, being adjustable in length, as by means of the screw member 10 adapted to variably space the parts 11 and 12 of the support 8.

The upper part 9 of the attachment is preferably unitary in character and is preferably, though not necessarily, formed integrally with the frame of the motor. The said member 9 is to advantage formed with a plurality of parts or arms 9', rigid with and projecting upward from the motor and formed so as to accommodate journal members 13 disposed in alinement and adapted to fit on the shaft extension 2'. The foot part 11 and motor supporting part 12 of the lower member 8 of the motor attachment are cylindrical and hollow and adapted to telescopically receive freely the ends of the screw member 10 respectively.

The spacing adjustment of the parts 11 and 12 is effected by means of a pair of nuts 14 in threaded engagement with the screw 10, and bearing against the adjacent end faces of the parts 11 and 12 respectively. Means are preferably provided for locking the nuts when the latter are properly adjusted for holding the motor at the proper height with respect to the machine 1 and shaft 2. For this purpose the parts 11 and 12 are horizontally drilled and tapped adjacent to the nuts so as to accommodate a machine screw the head of which when the screw is set bears upon the adjacent flat edge of the corresponding nut 14, and locks it against turning.

The upper face of the support 12 and the bottom and adjacent sides of the motor frame are suitably formed to fit together, and are drilled and tapped as at 15 in the bearing or foot parts to receive the bolts 15′, for mounting the motor either uprightly or on either side, as illustrated in Fig. 2 where full lines indicate the position of the motor in its upright position and the dotted lines on opposite sides represent alternative positions showing the motor on its opposite sides respectively. Each of the three bearing sides of the motor is preferably flat, but the form of the frame is not necessarily limited to plane bearing surfaces, so long as the motor can be laterally tilted 90° each way from the upright position. Each journal 13 is provided with a threaded aperture on the top and on each side adapted to receive an oil cup 13′ to be positioned uprightly for whatever position in which the motor is mounted, the unused apertures being closed by suitable screw plugs 16 as shown in the drawings.

In some instances, it may be preferable to use a belt connection rather than the gearing 5—17 for the motor, in which case the belt connection illustrated in Fig. 3 may be used, the motor pulley 18 being connected by the V-belt 19 to the machine pulley 20 keyed to the shaft 2.

The method of attaching the device to the machine to be driven is as follows: The base part 11 is placed on the floor under the shaft, or if preferred, at either side, and the screw part 10 is telescoped down into the base aperture. Then the part 12, preferably without the motor attached, is slid down telescopically on the upper end of screw 10. The motor having the arms 9 is then applied to the machine 1 by threading the shaft end 2′ into the journals 13, after which the support 12 is bolted to the motor frame, the nuts 14 adjusted and locked, and the base piece 11 fastened to the floor by the lag screws 21, one for each foot 11′.

The part 9 and journals 13 are secured against movement lengthwise of shaft 2 by means of the rings or sleeves 22 secured on said shaft by set screws 23.

Provision is made for running the wires supplying current for the motor down through the support part 8 which is hollow throughout its length, including the adjustable connector 10. A conduit 24 is provided connecting the base member 11 with the starting box or controller 25 on the machine 1. An aperture 26 in the upper part of the member 12 permits admission of the wires from the motor to the interior of the support 8. Said conduit may emerge from the base between the feet members 11′, or may be extended down and run under the floor to machine 1, as will be understood.

Although but one specific embodiment of this invention is herein shown and described, it will be understood that numerous details of the construction shown may be altered or omitted without departing from the spirit of this invention as defined by the following claims.

I claim:

1. A machine comprising a frame having a shaft journaled thereon, in combination with an attachment comprising a motor operatively connected to said shaft, a connection rigid with the frame of said motor and mounted turnably on said shaft, and an extensibly adjustable support comprising a foot part and a relatively movable body part attached to said motor.

2. A motor comprising a frame having a body part formed with outwardly facing foot or bearing surfaces and having a laterally disposed bearing part provided with a bearing positioned parallel to the motor axis.

3. A motor having a frame provided with a lateral bearing member disposed parallel with the motor axis, in combination with an adjustable support adapted for attachment to said frame.

4. A power driven machine having a shaft extension, in combination with an extensibly adjustable motor attachment resting on the floor and having a bearing for said extension, said attachment including a motor operatively connected to said shaft extension.

5. A machine having a power transmitting shaft extension, in combination with a dynamo-electric machine operatively connected to said shaft, adjustable means for stationarily mounting said latter mentioned machine intermediately of said shaft extension and the floor, and in predetermined spaced relation with respect to said shaft extension.

6. A machine having a shaft extension adapted to receive motive power, in combination with a motor operatively connected to said shaft extension, and supporting means for said motor comprising a pair of rigid members disposed above and below said motor respectively, the upper member being turnably connected to said shaft, one of said members being formed to fit against the base or foot part of said motor and the other being rigid with the top part, and one of said members being extensibly adjusted.

7. A machine having an overhanging shaft, in combination with a motor, an attachment or mounting therefor comprising an adjustably extensible support, and a bearing member attached to said motor and mounted on said shaft, said support including a body part to which said motor is attached, and a relatively movable foot part adapted for adjustment with respect to the body part, said motor being operatively connected to said shaft.

8. A motor attachment having rigid bearing and foot members extending above and below respectively.

9. A motor attachment having rigid bearing and foot members extending above and below respectively, one of said members being extensibly adjustable.

10. An attachment comprising a motor having a frame adapted for mounting in a plurality of positions and a detachable support having an upwardly facing part adapted to receive said motor in any of its several positions.

11. An attachment comprising a motor having a frame adapted for mounting in a plurality of positions and a detachable support having an upwardly facing part adapted to receive said motor in any of its several positions, said frame having a laterally projecting arm provided with a bearing disposed parallel with the motor axis.

12. An attachment for an electric motor driven machine comprising an adjustable standard or support for the motor, said standard being apertured and adapted to contain the wiring leading to the motor, and a steadying arm connecting said motor and the drive shaft of the machine and journaled to the latter.

13. An attachment for an electric motor driven machine comprising an adjustable standard or support for the motor, said standard being apertured and adapted to contain the wiring leading to the motor, a conduit extending from said standard to said machine, and a steadying arm connecting said motor and the drive shaft of the machine and journaled to the latter.

14. A motor attachment adapted for supporting a motor in a plurality of positions and comprising a lateral bearing member on the frame of the motor, and an upright extensibly adjustable standard adapted for attachment to the opposite part of the motor frame.

15. A machine having a driving shaft, in combination with a power supplying attachment including a motor, a pair of means projecting radially from said motor, one of said means having a bearing disposed parallel with the motor axis and coacting with said shaft, and the other of said means being disposed at an angle from the first mentioned means and adapted to serve as a support for said motor.

Signed at Chicago this 24th day of October, 1916.

AUSTIN KIMBLE.